(12) United States Patent
Rhee et al.

(10) Patent No.: US 7,977,008 B2
(45) Date of Patent: Jul. 12, 2011

(54) HIGH TEMPERATURE PROTON EXCHANGE MEMBRANE USING IONOMER/SOLID PROTON CONDUCTOR, PREPARATION METHOD THEREOF AND FUEL CELL CONTAINING THE SAME

(75) Inventors: Hee-Woo Rhee, Seoul (KR); Min-Kyu Song, Seoul (KR); Young-Taek Kim, Kyungki-do (KR); Ki-Hyun Kim, Seoul (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 1109 days.

(21) Appl. No.: 10/564,556

(22) PCT Filed: Nov. 26, 2003

(86) PCT No.: PCT/KR03/02571
§ 371 (c)(1),
(2), (4) Date: Jun. 27, 2006

(87) PCT Pub. No.: WO2005/006474
PCT Pub. Date: Jan. 20, 2005

(65) Prior Publication Data
US 2007/0026284 A1 Feb. 1, 2007

(30) Foreign Application Priority Data
Jul. 14, 2003 (KR) .................... 10-2003-0047980

(51) Int. Cl.
*H01M 8/10* (2006.01)
*C08J 5/20* (2006.01)
(52) U.S. Cl. .......................................... 429/491; 521/27
(58) Field of Classification Search .................. 429/491
See application file for complete search history.

(56) References Cited

U.S. PATENT DOCUMENTS

| 5,512,391 A | 4/1996 | Fleischer |
| 5,580,681 A | 12/1996 | Fleischer |
| 2003/0012996 A1 | 1/2003 | Bitterlich et al. |
| 2004/0038105 A1* | 2/2004 | Hennige et al. ............. 429/33 |

OTHER PUBLICATIONS

"The 1st International Conference of Polymer Batteries and Fuel Cells", Jun. 1-6, 2003 (5 pages).

* cited by examiner

*Primary Examiner* — Karie O'Neill Apicella
(74) *Attorney, Agent, or Firm* — Smith, Gambrell & Russell, LLP

(57) ABSTRACT

The present invention relates to a high temperature proton-conducting polymer membrane, a preparation method thereof, a membrane-electrode assembly using the same and a fuel cell containing the same. More particularly, it relates to a proton-conducting polymer membrane enabling fuel cell operation under high temperature and normal pressure condition, wherein sulfoalkyl or sulfoaryl groups are introduced between layers of metal phosphate and cation exchange groups are present in side chains, a preparation method thereof and a membrane-electrode assembly using the proton exchange membrane and a fuel cell containing the same.

7 Claims, 6 Drawing Sheets

HIGH TEMPERATURE PROTON EXCHANGE MEMBRANE USING IONOMER/SOLID PROTON CONDUCTOR, PREPARATION METHOD THEREOF AND FUEL CELL CONTAINING THE SAME

BACKGROUND OF THE INVENTION

1. Field of the Invention

The present invention relates to a high temperature proton-conducting polymer membrane, a preparation method thereof, a membrane-electrode assembly using the same and a fuel cell containing the same. More particularly, it relates to a proton-conducting polymer membrane enabling fuel cell operation under high temperature and normal pressure condition, wherein sulfoalkyl or sulfoaryl groups are introduced between layers of metal phosphate and cation exchange groups are present in side chains, a preparation method thereof and a membrane-electrode assembly using the proton exchange membrane and a fuel cell containing the same.

2. Description of the Related Art

A fuel cell is an electricity-generating system that converts the energy generated from electrochemical reaction of fuel and an oxidizer into electrical energy. Recently, there has been increasing demands for the development of high-performance fuel cell offering good energy efficiency, functioning at high temperature and having good reliability which can effectively handle the environmental problems, exhaust of energy sources and application of fuel cell cars. Further, there has been a demand for the development of polymer membrane functioning at high temperature to improve efficiency of fuel cells.

Fuel cells are largely classified as follows: carbonate fuel cells functioning at high temperature (500 to 700° C.); phosphate fuel cells functioning at about 200° C.; and alkaline fuel cells and polymer fuel cells functioning in the temperature range of from room temperature to about 100° C.

Of these, polymer fuel cells are considered as clean energy source of the future that can replace fossil energy. They have good output density and energy transfer efficiency. Also, since they function at room temperature and can be prepared in small size, they may be used in various fields such as clean cars, household power generation systems, mobile communication devices, medical devices, military equipments and space equipments.

There are two representing types in polymer fuel cells: proton exchange membrane fuel cells (PEMFC), which directly use hydrogen gas as fuel, and direct methanol fuel cells (DMFC), which directly provide liquid ethanol to anode as fuel.

The PEMFC is a power generation system that generates DC electricity from electrochemical reaction between hydrogen and oxygen. FIG. 1 shows a schematic diagram of PEMFC.

In a PEMFC, a proton-conducting polymer membrane 11 is located between an anode and a cathode. To be specific, a PEMFC comprises a proton-conducting polymer membrane 11 made of solid polymer, which is about 50 to 200 μm thick; support layers 14, 15 which feed the reaction gas; catalyst layers 12, 13 wherein oxidation and reduction of the reaction gas takes place, which is respectively located in an anode and a cathode (hereinafter, anode and cathode are collectively termed as "gas diffusion electrodes"); and a carbon plate 16 having a gas injection hole and functioning as current collector. Catalyst layers 12, 13 are located on support layers 14, 15 of the gas diffusion electrodes. The support layers 14, 15 are made of carbon fiber or carbon paper and their surface are treated so that water transferred to the proton-conducting polymer membrane 11 and water generated from the reaction may penetrate with ease.

At the anode of the PEMFC, a hydrogen gas is reduced to protons and electrons. Thus produced protons are then transferred to the cathode after passing through the proton-conducting polymer membrane 11.

At the cathode, an oxygen molecule takes up electrons and is oxidized into oxygen ions. The oxygen ions react with the protons transferred from the anode to form a water molecule.

While the proton-conducting polymer membrane is an electrical insulator, it functions as medium transferring protons from the cathode to the anode and separates gaseous or liquid fuel from the oxidizing gas.

Accordingly, the proton-conducting polymer membrane should have good mechanical properties and electrochemical stability. In addition, it should be able to be formed into a thin sheet to improve mechanical properties and heat stability and lower resistance. Further, it should not expand much when there is liquid penetration.

Currently, as such polymer membrane, fluorine based membranes having fluorinated alkylene in the main chain and sulfonate groups at the end of the fluorovinyl ether side chains are used (e.g., products of Nafion and DuPont). However, they are too expensive to be used in fuel cells for cars. Further, the cell operation temperature is limited below 100° C. due to increase in membrane resistance by dehydration at high temperature. The current fuel cells cannot be operated at high temperature under normal pressure condition due to the dehydration of proton-conducting polymer membrane. They require external pressure of at least 3 atm for operation at high temperature.

Therefore, researches have been focused on various polymer materials and organic/inorganic composite materials having superior electrochemical properties and heat stability and are also capable of solving the above-mentioned problems. Typical examples are heat-resistant aromatic polymers such as polybenzimidazole, polyether sulfone and polyether ketone. However, these aromatic polymers are too rigid to be dissolved, so that they are difficult to be prepared in the form of a membrane.

Researches on preparing inorganic composite materials comprising highly hygroscopic silica are in the progress. However, they also have problems in electrical conductivity since inorganic materials cannot transfer protons, or only a few if any.

SUMMARY OF THE INVENTION

The present inventors found out that a proton-conducting polymer membrane prepared by dispersing a layered ionomer/solid proton conductor, in which sulfoalkyl or sulfoaryl groups are inserted between the metal phosphate layers, on a proton-conducting polymer having proton-exchanging groups at the side chains has superior electrochemical properties and heat stability.

Thus, it is an object of the present invention to provide a proton-conducting polymer membrane having superior electrochemical and mechanical properties, heat stability and is usable at high temperature by applying an ionomer/solid proton conductor having ion conductivity at room temperature and high temperature, and a preparation method thereof.

It is another object of the present invention to provide a membrane-electrode assembly using the proton-conducting polymer membrane and a fuel cell containing the membrane-electrode assembly.

DETAILED DESCRIPTION OF THE PREFERRED EMBODIMENTS

Figure 1:
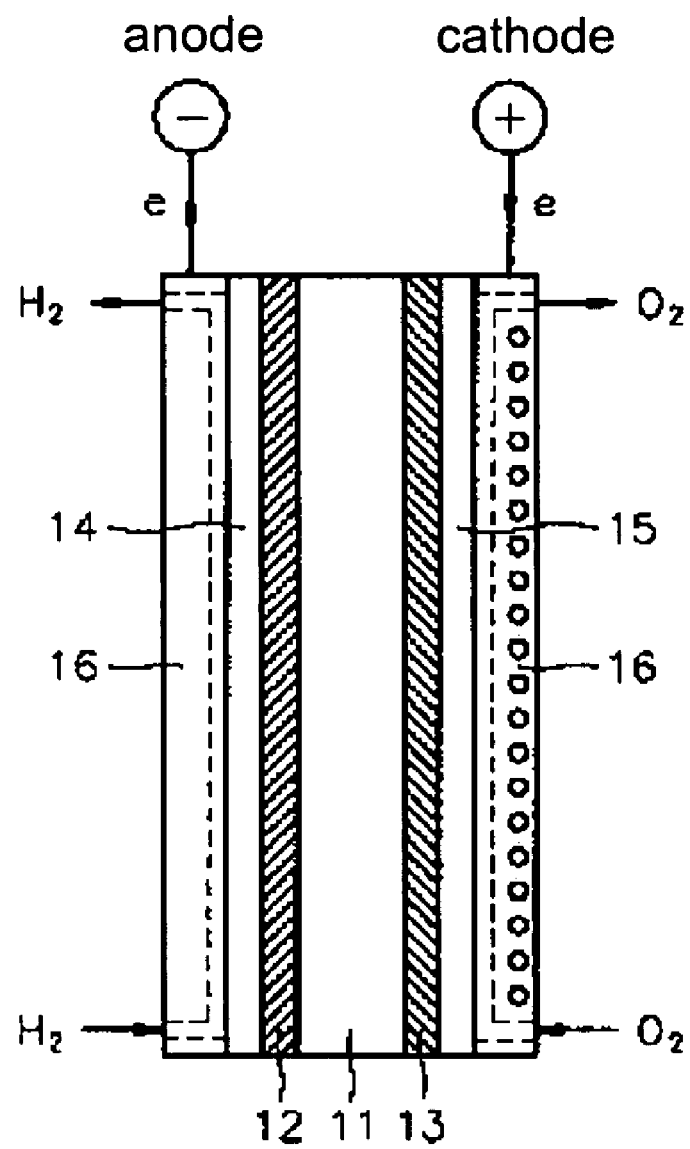
FIG. 1 is a schematic diagram showing the general structure of a proton-conducting polymer membrane fuel cell.

The present invention relates to a high temperature proton-conducting polymer membrane wherein 1 to 40 parts by weight of ionomer/solid proton conductor is dispersed in 100 parts by weight of proton-conducting polymer having proton-exchanging groups in side chain.

The present invention also relates to a method of preparing a high temperature proton-conducting polymer membrane which comprises the steps of: 1) dissolving a proton-conducting polymer having proton-exchanging groups in side chain in an organic solvent to prepare a 5 to 10 wt % proton-conducting polymer solution; 2) dispersing an ionomer/solid proton conductor in an organic solvent to prepare a 1 to 40 wt % ionomer/solid proton conductor solution; 3) mixing the proton-conducting polymer solution and said ionomer/solid proton conductor solution, so that 1 to 40 parts by weight of proton-conducting polymer is mixed with 100 parts by weight of ionomer/solid proton conductor, to prepare a mixture solution; and 4) preparing a polymer membrane using the mixture solution.

The present invention also relates to a membrane-electrode assembly for fuel cell using the proton-conducting polymer membrane and a fuel cell containing the same.

The preparing method according to the present invention will be described in detail.

First, a proton-conducting polymer having proton-exchanging groups in side chain is dissolved in an organic solvent to prepare a 5 to 10 wt % proton-conducting polymer solution.

The proton-exchanging groups may be sulfonic acid, carboxylic acid, phosphoric acid, phosphonic acid or derivatives thereof.

For a proton-conducting polymer, those having sulfonic acid groups, carboxylic acid groups, phosphoric acid groups, phosphonic acid groups or derivatives thereof may be used. For commercially available proton-conducting polymers, there are Nafion of E.I. Dupont de Nemours, Flemion of Asahi Glass KK, Aciplex of Asahi Chemical Industry, sulfonated-poly(ether ether ketone) (s-PEEK), polybenzimidazol (PBI), etc.

For an organic solvent, N-methyl-2-pyrrolidinone (NMP), dimethylformamide (DMF), dimethylacetamide (DMA), tetrahydrofuran (THF), dimethylsulfoxide (DMSO), acetone, methyl ethyl ketone (MEK), tetramethylurea, trimethyl phosphate, butyrolactone, isophorone, carbitol acetate, methyl isobutyl ketone, n-butyl acetate, cyclohexanone, diacetone alcohol, diisobutyl ketone, ethyl acetoacetate, glycol ether, propylene carbonate, ethylene carbonate, dimethyl carbonate or diethyl carbonate may be used alone or in combination. Said organic solvent is used so that the concentration of the proton-conducting polymer solution ranges from 5 to 10 wt %. If the concentration is below 5 wt %, the physical properties of the membrane become poor. In contrast, if it exceeds 10 wt %, the membrane becomes too viscous.

Next, an ionomer/solid proton conductor is dispersed in an organic solvent to prepare a 5 to 10 wt % ionomer/solid proton conductor solution.

To maintain ion conductivity at room temperature and high temperature above 100° C., a layered ionomer/solid proton conductor having sulfoalkyl or sulfoaryl groups inserted between metal phosphate layers is used. Here, the metal element may be a group IV element such as Zr, Ti, Ce, Th and Sn. More specifically, a compound selected from the following Chemical Formula 1 may be used for said ionomer/solid proton conductor:

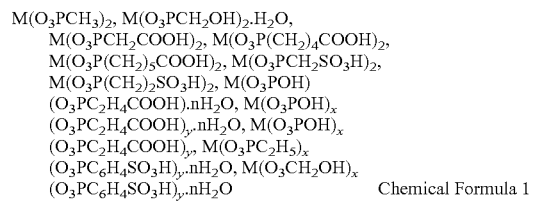

Chemical Formula 1 wherein M is a group IV element selected from the group consisting of Zr, Ti, Ce, Th and Sn; $x+y=2$; and n is a real number in the range from 0 to 20.

Particularly, zirconium phosphate gives the best result. More specifically, $Zr(O_3PC_2H_5)_x(O_3PC_6H_4SO_3H)_y \cdot nH_2O$ ($x+y=2$; $y=0.7$ to 1; $n=3$ to 12) may be used.

Zirconium sulfophenyl phosphate, one of ionomer/solid proton conductors to be used in the present invention, has alkyl sulfate or aryl sulfate groups between the zirconium phosphate layers.

In the zirconium phosphate, a zirconium element bound to three oxygen atoms forms a monoclinic system and a phosphate group located at the tetrahedral site functions as crosslinkage, and thus forms a layered structure. The phosphate groups offers a space in which six water molecules can be held, and water molecules inserted between the layers form hydrogen bonds to P—OH groups, so that the layered structure is maintained by van der Waals' force. Accordingly, layered zirconium phosphate has superior thermal properties and chemical resistance.

Proton transfer in zirconium phosphate mostly happens on the hydrated surface of. More specifically, the ion conductivity ranges from $10^{-3}$ to $10^{-6}$ S/cm depending on number of phosphate groups on the surface and relative humidity. Especially, proton transfer does not happen on the surface if non-hydrated, but proton hops between P—OH groups. Therefore, the distance between phosphate groups of each layer is 7.4 Å at temperature below 220° C. and 6.8 Å at temperature above 220° C., and the ion conductivity is about $10^{-6}$ S/cm. If interlayer material is inserted, the distance between layers increases. But, the ion conductivity of zirconium phosphate is improved because the inserted material helps proton transfer.

The ionomer/solid proton conductor is dissolved in an organic solvent to prepare an ionomer/solid proton conductor solution. For an organic solvent, the one used in preparing said proton-conducting polymer solution may be used.

The concentration of the ionomer/solid proton conductor solution is controlled to 5 to 10 wt %. If the concentration is below 5 wt %, the amount of solvent used increases. In contrast, if it exceeds 10 wt %, the degree of dispersion is reduced.

The proton-conducting polymer solution is mixed with said ionomer/solid proton conductor solution, so that 100 parts by weight of proton-conducting polymer is mixed with 1 to 40 parts by weight of ionomer/solid proton conductor, to prepare a mixture solution.

If the content of said ionomer/solid proton conductor is below 1 part by weight, the degree of dispersion becomes too low to maintain ion conductivity. In contrast, if it exceeds 40 parts by weight, excess ionomer/solid proton conductor particles are dispersed in the proton-conducting polymer membrane, so that the mechanical strength of the membrane becomes poor.

Lastly, the mixture solution is prepared into a membrane with a desired thickness by solution casting method or heating compression method. Preferably, the thickness of the polymer membrane is about 30 to 125 μm, and more preferably about 50 to 80 μm. If the thickness exceeds 125 μm, the proton conductivity decreases. In contrast, if it is below 30 μm, the mechanical strength is decreased and fuel may penetrate the membrane.

Such prepared high temperature proton-conducting polymer membrane, wherein 1 to 40 parts by weight of ionomer/solid proton conductor is dispersed in 100 parts by weight of proton-conducting polymer having proton-exchanging groups in side chain based on the solid content, has superior mechanical properties, electrochemical stability and heat stability. If the content of the ionomer/solid proton conductor is below 1 part by weight, a proton transfer path may not be formed. In contrast, if it exceeds 40 parts by weight, the physical properties of the membrane become poor.

If a polymer electrolyte fuel cell can be operated at high temperature above 100° C., the electrode catalyst activity and electrode reactivity improve, so that the fuel efficiency may be improved with a small amount of a catalyst. Decrease in use of an expensive platinum catalyst may reduce the cost of the fuel cell system. Also, hydrocarbons contained in the modified hydrogen fuel (several ppms) are oxidized to carbon monoxide on the electrode surface by a catalytic reaction. The generated carbon monoxide is deposited on the platinum catalyst surface and contaminates the catalyst. Since the deposition of carbon monoxide on the catalyst is an exothermic reaction, the catalyst contaminant may be alleviated even when a modified hydrogen fuel containing a small amount of hydrocarbon is used, if the fuel cell is operated at high temperature. Also, if a fuel cell can be operated without applying external pressure, the external pressurizing equipment and humidification equipment may be reduced or removed thereby effecting the optimization of the whole system as well as cost reduction.

Thus prepared high temperature proton-conducting polymer membrane may be used to prepare a membrane-electrode assembly for fuel cell, and the membrane-electrode assembly may be contained in a fuel cell.

Hereinafter, the present invention is described in more detail through Examples. This invention is explained in more detail based on the following Examples but they should not be construed as limiting the scope of this invention.

EXAMPLES

Preparation Example I-1

Preparation of Zirconium Sulfophenyl Phosphate Solution 20.2 g of phenylphosphonic acid and 8.56 g of sulfotrioxide were mechanically mixed at 180° C. for 24 hr to prepare nz-sulfophenylphosphonic acid. After diluting with excess water, the mixture was added with 15% barium chloride. The precipitate was removed by filtering and excess dimethylether was added to extract unreacted phenyl phosphonic acid and obtain a m-sulfophenylphosphonic acid solution.

17.8 g of zirconyl chloride was dissolved in 100 mL of water. Then, HF (hydrofluoric acid) was added, so that the F/Zr proportion becomes 19.78. Then, 20 g of purified m-sulfophenylphosphonic acid was added to the zirconyl chloride solution along with excess phosphoric acid solution. After stirring at room temperature for about 1 hr, a zirconium sulfophenyl phosphate solution was obtained.

Preparation Example I-2

A zirconium sulfophenyl phosphate solution was prepared as in Preparation Example I-1, except for changing the F/Zr proportion to 13.85.

Preparation Example I-3

A zirconium sulfophenyl phosphate solution was prepared as in Preparation Example I-1, except for changing the F/Zr proportion to 6.92.

Preparation Example I-4

A zirconium sulfophenyl phosphate solution was prepared as in Preparation Example I-1, except for changing the F/Zr proportion to 3.46.

Preparation Example I-5

A zirconium sulfophenyl phosphate solution was prepared as in Preparation Example I-1, except for changing the F/Zr proportion to 0.

Preparation Example II

Preparation of Proton-Conducting Polymer Solution 5 g of Nafion 117 (DuPont) was dissolved in 95 mL of dimethylacetamide to prepare a 5 wt % Nafion 117 solution.

Example: Preparation of High Temperature Proton-Conducting Polymer Membrane 10 g of the proton-conducting polymer solution prepared in Preparation Example II was mixed with 5 mL of the zirconium sulfophenyl phosphate solution prepared in Preparation Example I-5. After applying ultrasonic wave for 10 min using a sonicator, the mixture solution was stirred at 80° C. for 12 hr to prepare a proton-conducting polymer/zirconium sulfophenyl phosphate mixture solution wherein zirconium sulfophenyl phosphate is dispersed uniformly.

The obtained proton-conducting polymer/zirconium sulfophenyl phosphate mixture solution was film-casted. After evaporating the solvent in an oven at about 100° C. for 4 hr to prepare a high temperature proton-conducting polymer membrane.

Thickness of thus obtained high temperature proton-conducting polymer membrane was measured using a micrometer (Mitutoyo, minimum measuring unit=0.001 mm). The thickness was about 50 μm.

Comparative Example 1

A proton-conducting polymer membrane was prepared as in Preparation Example II, except for mixing 10 g of the proton-conducting polymer solution with 0.02 g of zirconium phosphate.

Comparative Example 2

Commercially available Nafion 117 (DuPont, thickness=175 μm) proton-conducting polymer membrane was treated with hydrogen peroxide at 100° C. for 3 hr to remove pollutants on the surface. After treating again with 1M suluric acid solution at 100° C. for 2 hr, the polymer membrane was stored in deionized water

Test Example 1

FT-IR Analysis

Figure 2:
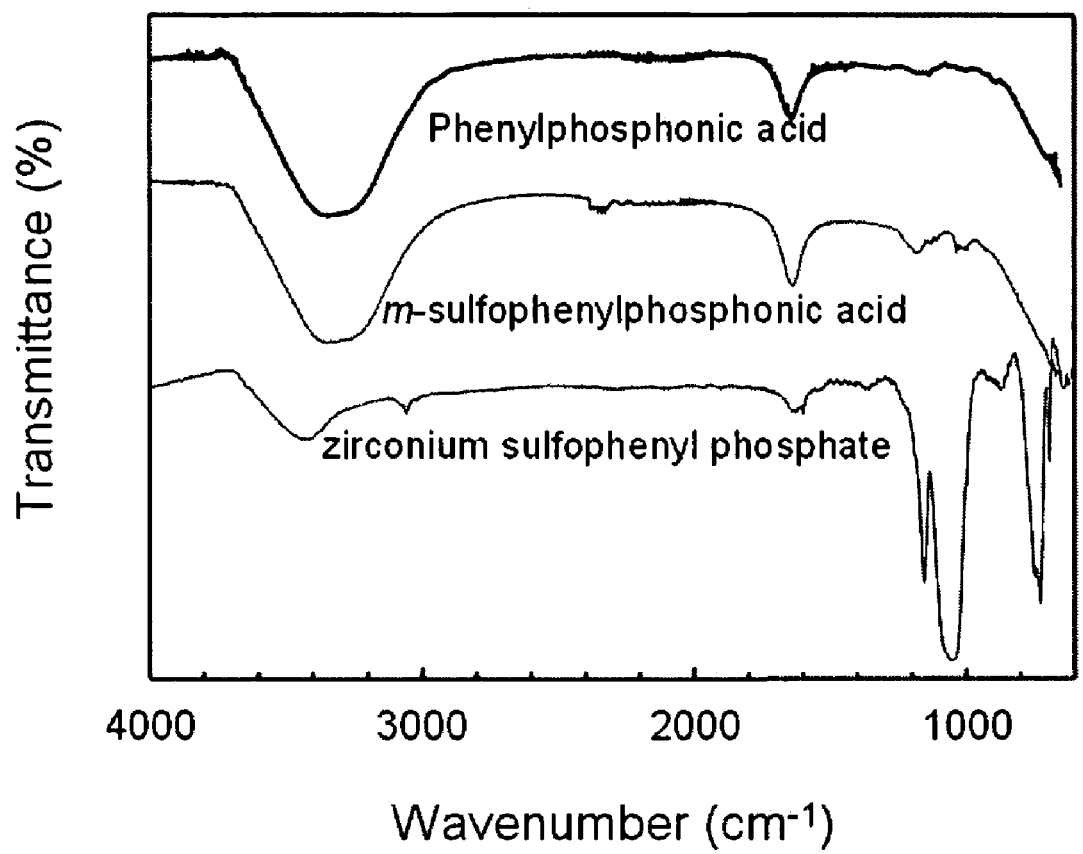
FIG. 2 is an FT-IR graph of zirconium sulfophenyl phosphate, precursor and intermediate prepared according to Preparation Example I-1.

The zirconium sulfophenyl phosphate prepared in Preparation Example I-1 was analyzed with FTS3000MX (BIO-RAD). The result is shown in FIG. 2. The analysis condition was as follows:
Wavelength (wave number): 4,000 to 400 $cm^{-1}$
Temperature: 25° C.
Humidity: 50%

Test Example 2

X-Ray Diffraction Analysis

Figure 3:
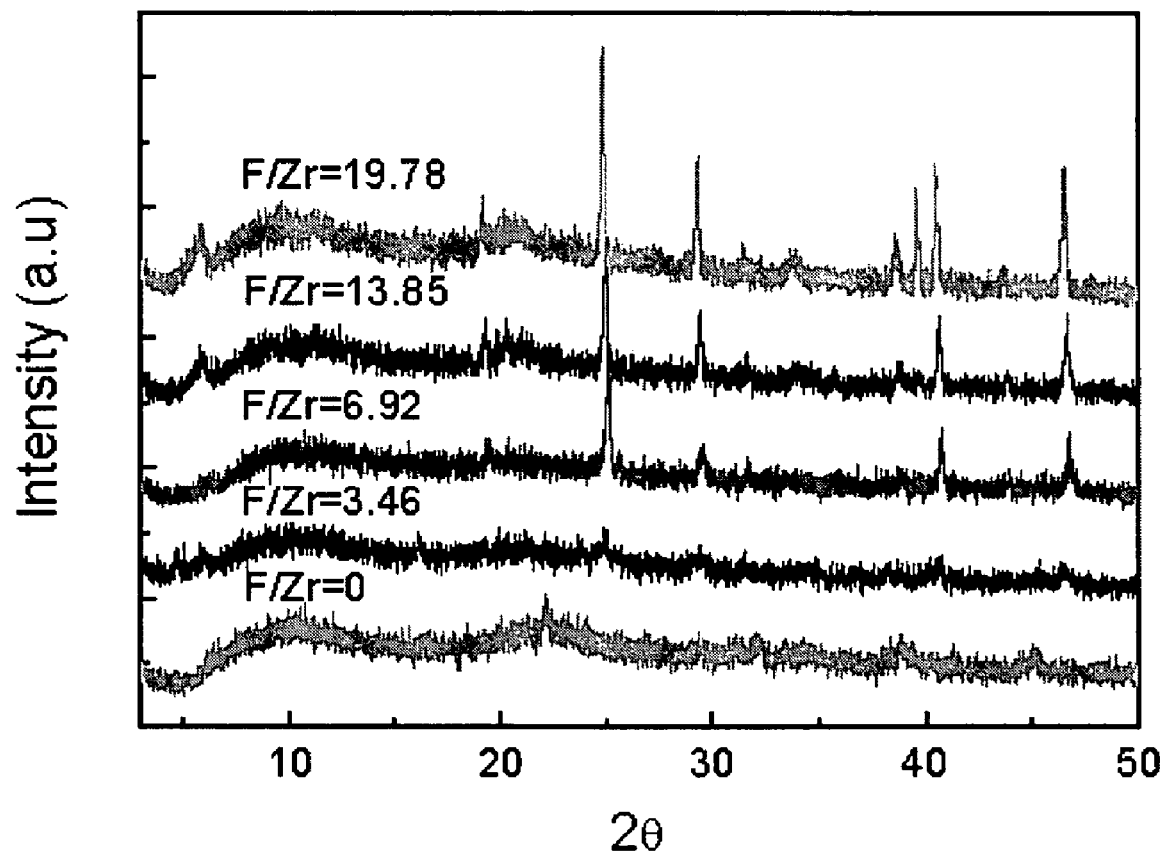
FIG. 3 is an XRD graph showing crystallinity of zirconium sulfophenyl phosphate prepared according to Preparation Examples I-1 to 5 depending on HF content.

Crystallinity of the zirconium sulfophenyl phosphate prepared in Preparation Example I-1 depending on F/Zr proportion was analyzed with a Rigaku Rad-C 4037A1 diffractometer. The result is shown in FIG. 3. The analysis condition was Cu-Ka emission (1.5406). As seen in FIG. 3, the crystallinity of zirconium sulfophenyl phosphate increases with the F/Zr proportion.

Test Example 3

Proton Conductivity Measurement

Conductance of the zirconium sulfophenyl phosphate prepared in Preparation Example I-1 was determined by the static current 4-terminal method. Constant AC current was applied to a 1 cm×5 cm×100 μm pellet located in a temperature- and humidity-controlled chamber. Difference in AC potential at the center of the sample was measured to identify the proton conductivity of the sample. The result is shown in FIG. 4.

Figure 4:
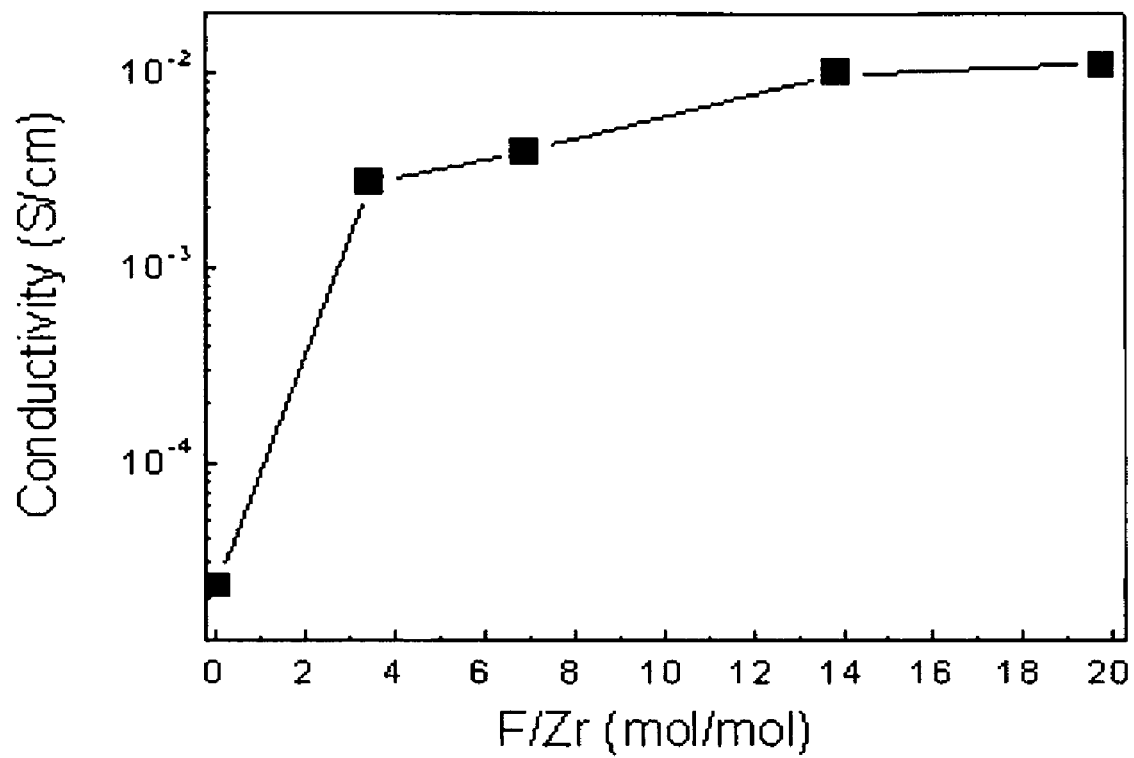
FIG. 4 is a graph showing ion conductivity of zirconium sulfophenyl phosphate prepared according to Preparation Examples I-1 to 5 depending on F/Zr proportion.

As seen in FIG. 4, the proton conductivity of zirconium sulfophenyl phosphate increases with the crystallinity. This is because the number of layers in a stack becomes large as the crystallinity of zirconium sulfophenyl phosphate increases. Thus it provides sufficient proton transporting channels in the interlayer region, which result in increasing proton conductivity.(내용확인 요망)

Test Example 4

Proton Conductivity Measurement

The proton-conducting polymer membranes prepared in Example and Comparative Examples 1 to 2 were tested as in Test Example 3, except for increasing the temperature from room temperature to 130° C. without external humidification. The result is shown in FIG. 5.

Figure 5:
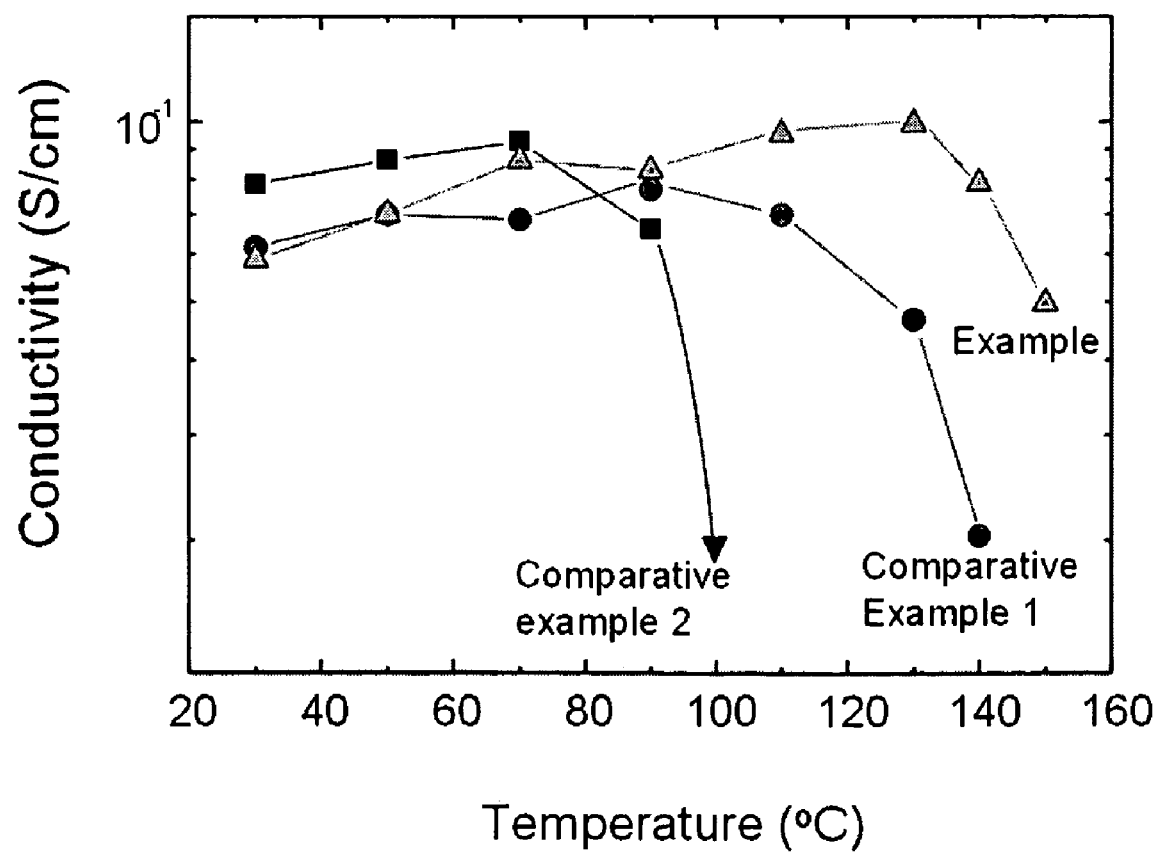
FIG. 5 is a graph showing ion conductivity of proton-conducting polymer membranes prepared according to Example and Comparative Examples 1 to 2 depending on temperature.

As seen in FIG. 5, the proton conductivity of Nafion decreases rapidly above 100° C. duet to dehydration. The proton-conducting polymer membrane wherein zirconium phosphate is dispersed shows proton conductivity above 100° C. due to the water-keeping effect of zirconium phosphate. However, the conductivity is not good because zirconium phosphate has low conductivity (Comparative Example 1).

On the other hand, the proton-conducting polymer membrane wherein zirconium sulfophenyl phosphate is dispersed shows good conductivity at a temperature above 130° C. (Example).

Test Example 5

Cell Performance Measurement

Commercially available catalyst electrode layers were coated on both sides of each proton-conducting polymer membrane prepared in Example and Comparative Examples 1 to 2 by hot-press coating method to prepare a membrane-electrode assembly (MEA).

Single sided ELAT electrode of E-TEK Inc. was used. Pt—Ru black catalyst was used at the cathode and Pt black catalyst was used at the anode. The hot-press condition was 140° C., 5 min and about 60 $kgf/cm^2$ of pressure. Silicone-coated glass fiber gaskets were positioned above and below the membrane-electrode assembly. The assembly was pressed with a carbon plate and sealed to fabricate a unit cell.

Figure 6:
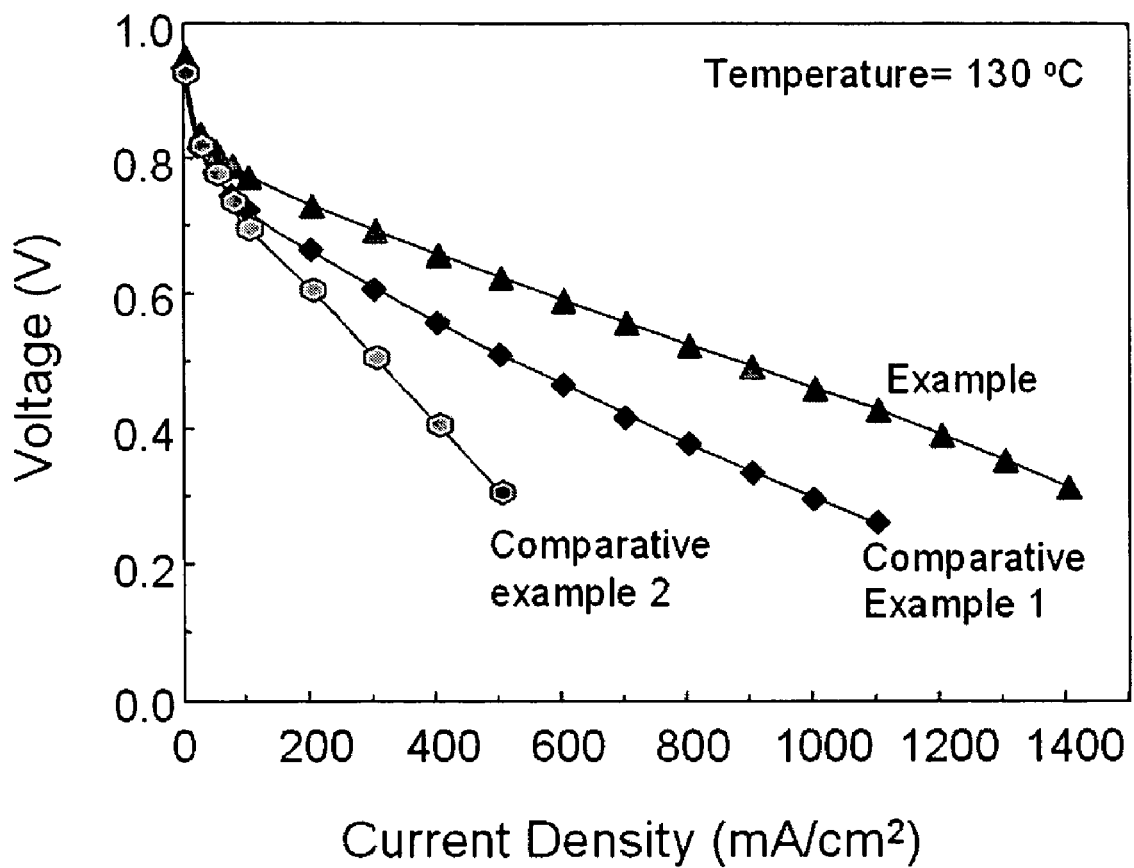
FIG. 6 is a graph showing current-voltage curves of proton-conducting polymer membranes prepared according to Example and Comparative Examples 1 to 2 at 130° C.

During the unit cell test, stoichiometric ratios of pure hydrogen and oxygen fed into the cathode and the anode were set at 2.0 and 3.0, respectively. The gas flow pressure was 30 psi. Cell performance was tested at 130° C. The result is shown in FIG. 6. As seen in FIG. 6, the fuel cell containing the high temperature proton-conducting polymer membrane prepared in Example showed high current density. On the other hand, fuel cells containing the proton-conducting polymer membranes prepared in Comparative Examples 1 to 2 showed low current density because of increase in resistance of proton-conducting polymer membranes due to dehydration.

As described above, the proton-conducting polymer membrane of the present invention, wherein sulfophenyl phosphonic acid is inserted between zirconium phosphate layers, can be operated at high temperature above 100° C., and thus it maintains higher ion conductivity at high temperature compared with the conventional polymer membranes. Accordingly, the catalyst activity at the electrode layer increases when a fuel cell is operated at high temperature. Therefore, decrease in the amount of catalyst to be used offers economical advantage. In addition, increased resistance of the catalyst to toxification improves durability of a fuel cell.

Also, since the method of preparing a proton-conducting polymer membrane according to the present invention is simple, it can be applied to mass production.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A proton-conducting polymer membrane wherein 1 to 40 parts by weight of solid proton conductor having sulfoalkyl or sulfoaryl groups in metal phosphate layers of the solid proton conductor wherein the metal is a group IV metal is dispersed in 100 parts by weight of proton-conducting polymer having proton-exchanging groups in side chain.

2. The proton-conducting polymer membrane of claim 1, wherein said proton-exchanging group is selected from the group consisting of sulfonic acid, carboxylic acid, phosphoric acid, phosphonic acid and derivatives thereof.

3. The proton-conducting polymer membrane of claim 1, wherein said solid proton conductor is a compound selected from the group consisting of:

$M(O_3PCH_3)_2$, $M(O_3PCH_2OH)_2 \cdot H_2O$, $M(O_3PCH_2COOH)_2$, $M(O_3P(CH_2)_4COOH)_2$, $M(O_3P(CH_2)_5COOH)_2$, $M(O_3PCH_2SO_3H)_2$, $M(O_3P(CH_2)_2SO_3H)_2$, $M(O_3POH)(O_3PC_2H_4COOH) \cdot nH_2O$, $M(O_3POH)_x(O_3PC_2H_4COOH)_{y \cdot nH2}O$, $M(O_3POH)_x(O_3PC_2H_4COOH)_y$, $M(O_3PC_2H_5)_x(O_3PC_6H_4SO_3H)_{y \cdot nH2}O$, $M(O_3CH_2OH)_x(O_3PC_6H_4SO_3H)_{y \cdot nH2}O$ wherein M is a group IV element selected from Zr, Ti, Ce, Th and Sn; x+y=2; and n is a real number in the range from 0 to 20.

4. The proton-conducting polymer membrane of claim 1, wherein said proton-conducting polymer membrane has a thickness ranging from 30 to 125 μm.

5. A membrane-electrode assembly using the proton-conducting polymer membrane of any one of claims 1, 2, 3 and 4.

6. A fuel cell containing the membrane-electrode assembly of claim 5.

7. A proton-conducting polymer membrane wherein 1 to 40 parts by weight of solid proton conductor having sulfoalkyl or sulfoaryl groups in crystalline metal phosphate layers of the solid proton conductor wherein the metal is a group IV metal is dispersed in 100 parts by weight of proton-conducting polymer having proton-exchanging groups in side chain.

* * * * *